(12) United States Patent
Roh et al.

(10) Patent No.: US 9,688,914 B2
(45) Date of Patent: Jun. 27, 2017

(54) LIQUID CRYSTAL MATERIAL AND LIQUID CRYSTAL DISPLAY DEVICE INCLUDING THE SAME

(71) Applicant: LG Display Co., Ltd., Seoul (KR)

(72) Inventors: Seung-Kwang Roh, Paju-si (KR); Woo-Young Choi, Daegu (KR)

(73) Assignee: LG DISPLAY CO., LTD., Seoul (KR)

( * ) Notice: Subject to any disclaimer, the term of this patent is extended or adjusted under 35 U.S.C. 154(b) by 1 day.

(21) Appl. No.: 14/292,514

(22) Filed: May 30, 2014

(65) Prior Publication Data

US 2015/0002797 A1   Jan. 1, 2015

(30) Foreign Application Priority Data

Jun. 28, 2013   (KR) .................. 10-2013-0075528

(51) Int. Cl.
*C09K 19/54*   (2006.01)
*C09K 19/52*   (2006.01)

(52) U.S. Cl.
CPC .............. *C09K 19/54* (2013.01); *C09K 19/52* (2013.01)

(58) Field of Classification Search
None
See application file for complete search history.

(56) References Cited

U.S. PATENT DOCUMENTS

| 2007/0108411 A1* | 5/2007 | Saito ................. C09K 19/3458 252/299.61 |
| 2011/0101270 A1* | 5/2011 | Manabe ................ C09K 19/32 252/299.62 |
| 2013/0248763 A1* | 9/2013 | Goebel et al. ........... 252/299.61 |
| 2013/0258268 A1* | 10/2013 | Goebel et al. ................ 349/186 |

FOREIGN PATENT DOCUMENTS

| CN | 101273110 A | 9/2008 |
| WO | WO 2012076104 A1 * | 6/2012 |
| WO | WO 2012076105 A1 * | 6/2012 |

* cited by examiner

*Primary Examiner* — Cynthia H Kelly
*Assistant Examiner* — Anna Malloy
(74) *Attorney, Agent, or Firm* — Birch, Stewart, Kolasch & Birch, LLP

(57) ABSTRACT

Discussed is a liquid crystal material including: a liquid crystal molecule including an alkenyl group; a phenol-based antioxidant; and a light stabilizer for recycling the phenol-based antioxidant.

2 Claims, 5 Drawing Sheets ized by the afterimages. As a result, high reliability is required in the LCD device as the public display.
LIQUID CRYSTAL MATERIAL AND LIQUID CRYSTAL DISPLAY DEVICE INCLUDING THE SAME The present application claims the benefit of Korean Patent Application No. 10-2013-0075528 filed in Republic of Korea on Jun. 28, 2013, which is hereby incorporated by reference for all purposes as if fully set forth herein.

BACKGROUND OF THE INVENTION

Field of the Invention

The present invention relates to a liquid crystal display (LCD) device, and more particularly, to a liquid crystal material having improved reliability and response time and an LCD device including the liquid crystal material.

Discussion of the Related Art

As the society has entered in earnest upon an information age, various display devices, such as an LCD device and an organic light emitting diode (OLED) display device, for displaying images are required.

The LCD device uses optical anisotropy and polarization properties of liquid crystal molecules. The liquid crystal molecules have a definite alignment direction as a result of their thin and long shapes. The alignment direction of the liquid crystal molecules can be controlled by application of an electric field across the liquid crystal molecules. As the intensity or direction of the electric field is changed, the alignment of the liquid crystal molecules also changes. Since incident light is refracted based on the orientation of the liquid crystal molecules due to the optical anisotropy of the liquid crystal molecules, images can be displayed by controlling light transmissivity.

Since the LCD device including a thin film transistor (TFT) as a switching element, referred to as an active matrix LCD (AM-LCD) device, has excellent characteristics of high resolution and displaying moving images, the AM-LCD device has been widely used.

The LCD device includes two substrates facing each other and a liquid crystal layer therebetween. The LCD device further includes a pixel electrode and a common electrode for generating an electric field. The liquid crystal layer is driven by the electric field.

For example, the LCD device is used for repeatedly displaying similar images in a public place. It may be called to as a public display. Since the public display repeatedly displays similar images in very long times, the reliability of the LCD device is an important fact.

Namely, in the public display, the displayed images remain in the screen as an afterimages, and the image quality of the public display is degraded by the afterimages. As a result, high reliability is required in the LCD device as the public display.

However, the LCD device for the public display having high reliability has a disadvantage in a response time. The LCD device for the public display having the high response time has a disadvantage in the reliability.

SUMMARY OF THE INVENTION

Accordingly, the present invention is directed to a liquid crystal material and an LCD device including the same that substantially obviate one or more of the problems due to limitations and disadvantages of the related art.

An object of the present invention is to provide a liquid crystal material having advantages in both of the reliability and the response time.

Another object of the present invention is to an LCD device including the liquid crystal material.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described herein, the present invention provides a liquid crystal material including: a liquid crystal molecule including an alkenyl group; a phenol-based antioxidant; and a light stabilizer for recycling the phenol-based antioxidant.

In another aspect of the present invention, the present invention provides a liquid crystal display device including: first and second substrates facing each other; a pixel electrode on the first substrate; a common electrode on one of the first and second substrates; first and second alignment layers respectively over the first and second substrates; and a liquid crystal layer positioned between the first and second alignment layers, the liquid crystal layer including: a liquid crystal molecule including an alkenyl group; a phenol-based antioxidant; and a light stabilizer for recycling the phenol-based antioxidant.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings. The same reference numbers may be used throughout the drawings to refer to the same or like parts.

To increase the reliability of the LCD device used as the public display, the liquid crystal material, which does not include an alkenyl group, is used.

Figure 1A:
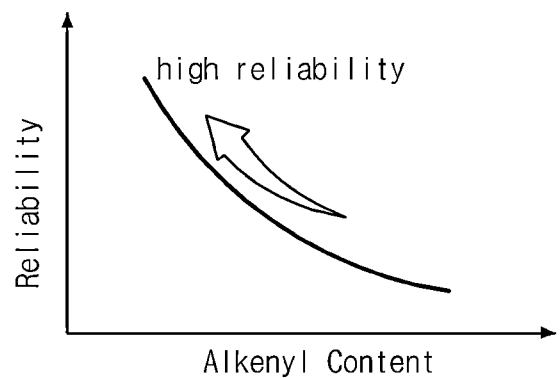
FIGS. 1A and 1B are graphs showing a relation between the reliability and the response time in a liquid crystal material according to an embodiment of the present invention.

Namely, referring to FIG. 1A, which is a graph showing a relation between the reliability and the alkenyl group content in the liquid crystal material, as the alkenyl group content in the liquid crystal material is increased, the displaying reliability of the LCD device is decreased. Accordingly, the liquid crystal material without the alkenyl group is used for the LCD device as the public display.

Figure 1B:
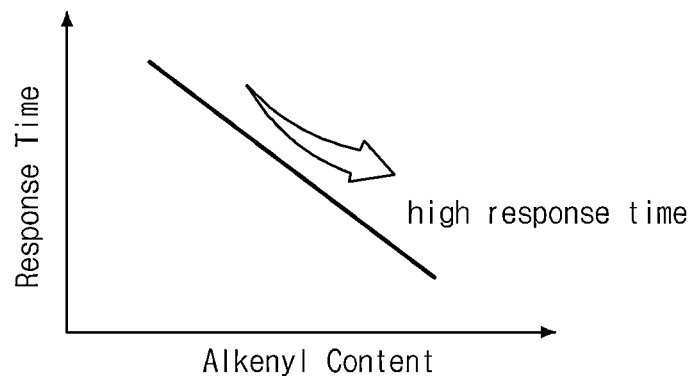

However, referring to FIG. 1B, which is a graph showing a relation between the response time and the alkenyl group content in the liquid crystal material, as the alkenyl group content in the liquid crystal material is decreased, the response time of the LCD device is decreased.

Namely, when the alkenyl group is excluded from the liquid crystal material to increase the reliability in the LCD device as the public display, a problem in that the response time of the LCD device is decreased is generated.

Figure 2:
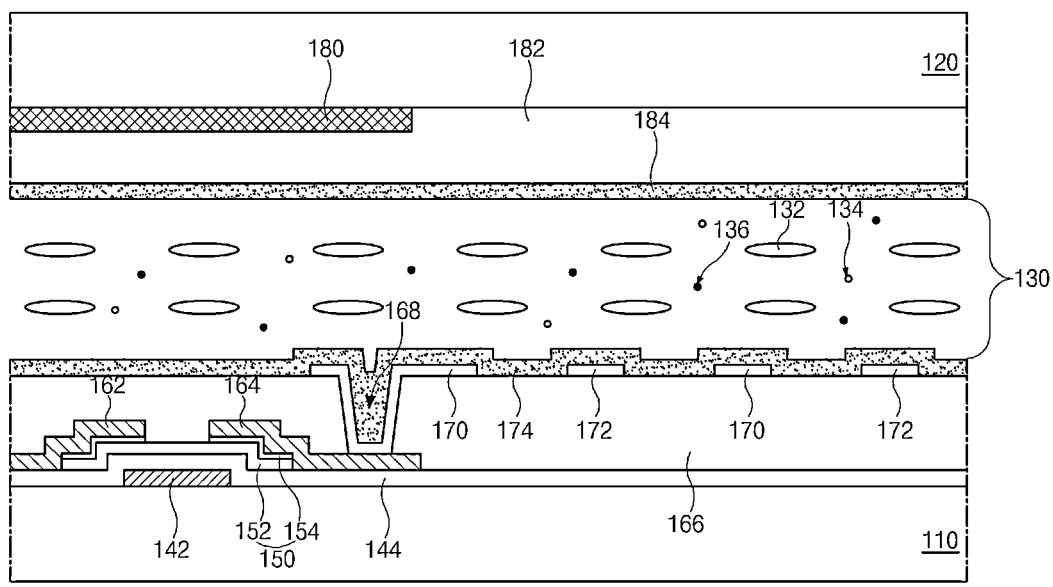
FIG. 2 is a schematic cross-sectional view of an LCD device according to an embodiment of the present invention.

FIG. 2 is a schematic cross-sectional view of an LCD device.

As shown in FIG. 2, the LCD device includes a first substrate 110, a second substrate 120 facing the first substrate 110, and a liquid crystal layer 130 between the first and second substrates 110 and 120.

On the first substrate 110, a pixel electrode 170 and a common electrode 172 are formed. An electric field is generated between the pixel and common electrodes 170 and 172 such that the liquid crystal layer 130 is driven. In addition, a color filter layer 182 is formed on the second substrate 120.

Particularly, a plurality of pixel regions (not shown) are defined in the first substrate 110, and a thin film transistor (TFT), the pixel electrode 170 and the common electrode 172 are formed in each pixel region.

The pixel region is defined by a gate line (not shown) and a data line (not shown) crossing each other. The TFT is connected to the gate and data lines.

The TFT includes a gate electrode 142, a gate insulating layer 144, a semiconductor layer 150, a source electrode 162 and a drain electrode 164. The gate electrode 142 is connected to the gate line, and the gate insulating layer 144 is formed on the gate electrode 142. The semiconductor layer 150 is formed on the gate insulating layer 144 and overlaps the gate electrode 142. For example, the semiconductor layer 150 may includes an active layer 152 of an intrinsic amorphous silicon and an ohmic contact layer 154 of an impurity-doped amorphous silicon. Alternatively, the semiconductor layer 150 may include an oxide semiconductor material or poly-crystalline silicon.

The source electrode 162 and the drain electrode 164 are formed on the semiconductor layer 150 and are spaced apart from each other. The source electrode 162 is connected to the data line.

A passivation layer 166 is formed on the TFT, and a drain contact hole 168 exposing the drain electrode 164 of the TFT is formed through the passivation layer 166.

The pixel electrode 170 and the common electrode 172 are formed on the passivation layer 166. The pixel electrode 170 and the common electrode 172 are alternately arranged with each other such that a horizontal electric field is generated between the pixel and common electrodes 170 and 172. The pixel electrode 170 contacts and is electrically connected to the drain electrode 164 of the TFT through the drain contact hole 168.

Alternatively, the pixel and common electrodes have the plate shape, and one of the pixel and common electrodes has an opening. In this instance, the pixel and common electrodes are positioned in different layers such that a fringe field is generated between the pixel and common electrodes.

In addition, the pixel electrode is formed on the first substrate 110, and the common electrode is formed on the second substrate 120. In this instance, a vertical electric field is generated between the pixel and common electrodes.

Referring again to FIG. 2, a first alignment layer 174 is formed on the pixel and common electrodes 170 and 172. For example, the first alignment layer 174 may be formed of polyimide.

On the second substrate 120, a black matrix 180 for shielding a non-display area, such as the TFT, the gate line and the data line, and a color filter layer 182 are formed. The black matrix 180 and the color filter layer 182 may be omitted.

A second alignment layer 184 is formed on the color filter layer 182. For example, the second alignment layer 184 may be formed of polyimide.

The liquid crystal layer 130 is positioned between the first and second substrates 110 and 120, and more particularly, between the first and second alignment layers 174 and 184. The liquid crystal layer 130 includes a liquid crystal molecule 132, a phenol-based antioxidant 134 and a light stabilizer 136.

An initial arrangement of the liquid crystal molecule 132 is controlled by the first and second alignment layers 174 and 184, and the liquid crystal molecule 132 includes an alkenyl group for increasing the response time.

For example, the alkenyl group is linked to an end of the liquid crystal molecule 132 such that the response time of the liquid crystal layer 130 is improved as shown in FIG. 1B.

However, when the liquid crystal molecule 132 includes the alkenyl group to increase the response time, a by-product is generated by reaction between the alkenyl group in the liquid crystal molecule 132 and a radical or an ion from the first and second alignment layers 174 and 184 such that the reliability of the LCD device is degraded.

Namely, the LCD device includes a backlight unit as a light source, and the first and second alignment layers 174 and 184 are exposed to a UV from the backlight unit or the outside. On the other hand, the first and second alignment layers 174 and 184 includes a functional group, such as "ROOH", at their end to control the arrangement of the liquid crystal molecule 132, and unstable radicals or ions are generated from the functional group of the first and second alignment layers 174 and 184 by the UV. The radicals or ions react with the alkenyl group, which includes the double bond linkage, such that the by-product is generated. The reliability of the LCD device is degraded by the by-product.

To prevent the generation of the by-product, the liquid crystal layer 130 of the present invention includes a phenol-based antioxidant 134. The phenol-based antioxidant 134 is represented by following Formula 1. In the Formula 1, each of R1 and R2 is selected from substituted or non-substituted alkyl group or hydrogen, and R3 is selected from substituted or non-substituted alkyl group, substituted or non-substituted alkyl-carbonyl group, substituted or non-substituted alkoxy group and hydrogen.

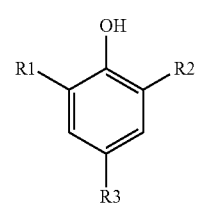

[Formula 1]

In addition, the liquid crystal layer 130 of the present invention further includes the light stabilizer 136 such that a side reaction generating the by-product is prevented and the phenol-based antioxidant 134 is recycled. As a result, the reliability of the LCD device is further improved.

The light stabilizer 136 is represented by following Formula 2. Namely, the light stabilizer 136 is a hindered amine light stabilizer (HALS). In the Formula 2, each of R4 and R5 is selected from hydrogen and substituted or non-substituted alkyl group, and R6 is selected from hydrogen and substituted or non-substituted alkoxy group.

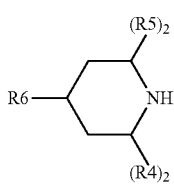

[Formula 2]

The phenol-based antioxidant 134 and the light stabilizer 136 have excellent solubility with the liquid crystal molecule 132 and excellent transmissivity. As a result, there is no problem in the driving property and the transmissivity of the liquid crystal layer 130 by the phenol-based antioxidant 134 and the light stabilizer 136.

The phenol-based antioxidant 134 reacts with the radicals or ions from the first and second alignment layers 174 and 184 such that the reaction between the radicals or the ions and the alkenyl group in the liquid crystal molecule 132. As a result, the degradation of the reliability of the LCD device by the by-product from the reaction between the radicals or ions and the alkenyl group in the liquid crystal molecule 132 is prevented.

Figure 3:
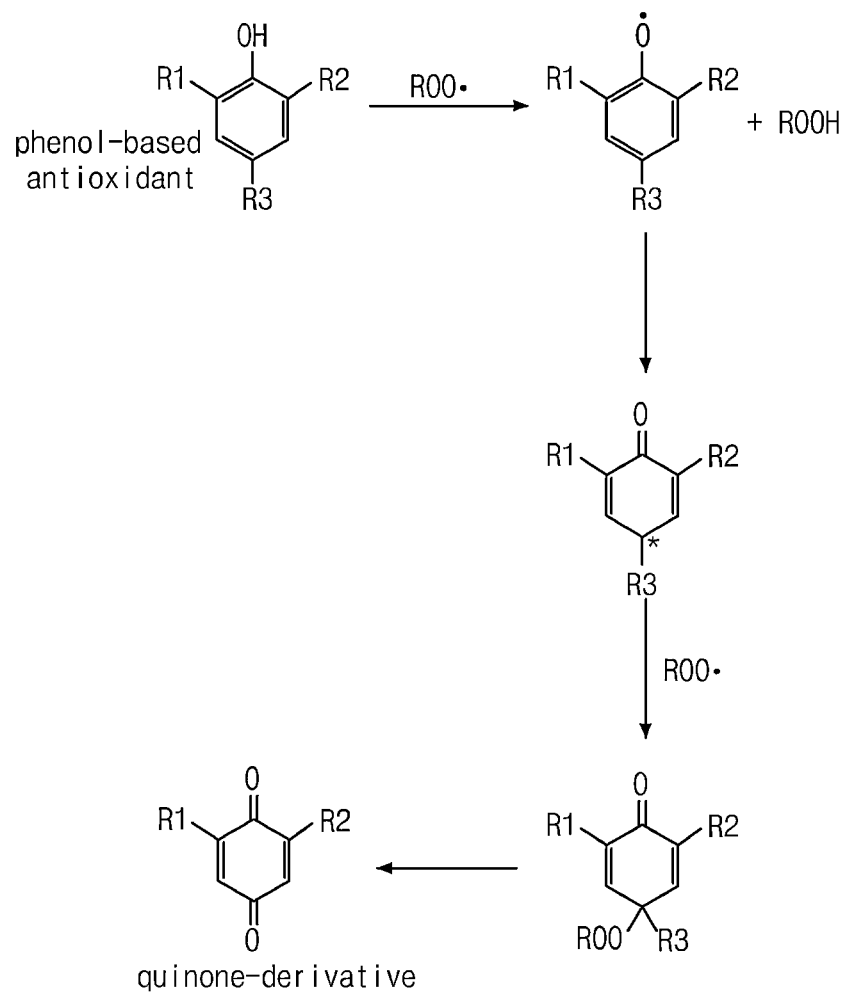
FIG. 3 is a view illustrating a reaction mechanism of a phenol-based antioxidant and a radical according to an embodiment of the present invention.

Referring to FIG. 3, which is a view illustrating a reaction mechanism of a phenol-based antioxidant and a radical, the phenol-base antioxidant reacts with the radicals (or ions) such that the radicals becomes stable. As a result, the side reaction between the radicals and the alkenyl group in the liquid crystal molecule is prevented.

However, the phenol-based antioxidant is finally changed into a quinone-derivative by the reaction with the radicals. In this instance, the phenol-base antioxidant does not have a function as the antioxidant. Accordingly, the reliability is increased by the phenol-based antioxidant in an initial driving state. However, after the LCD device is driven for long time, there is no effect by the phenol-based antioxidant. In addition, the quinine-derivative serves as impurities in the liquid crystal layer such that the driving property of the liquid crystal layer is degraded.

On the other hand, the HALS as the light stabilizer reacts with the radicals (or ions) such the radicals becomes stable. In addition, the phenol-based antioxidant is recycled by the HALS.

Figure 4:
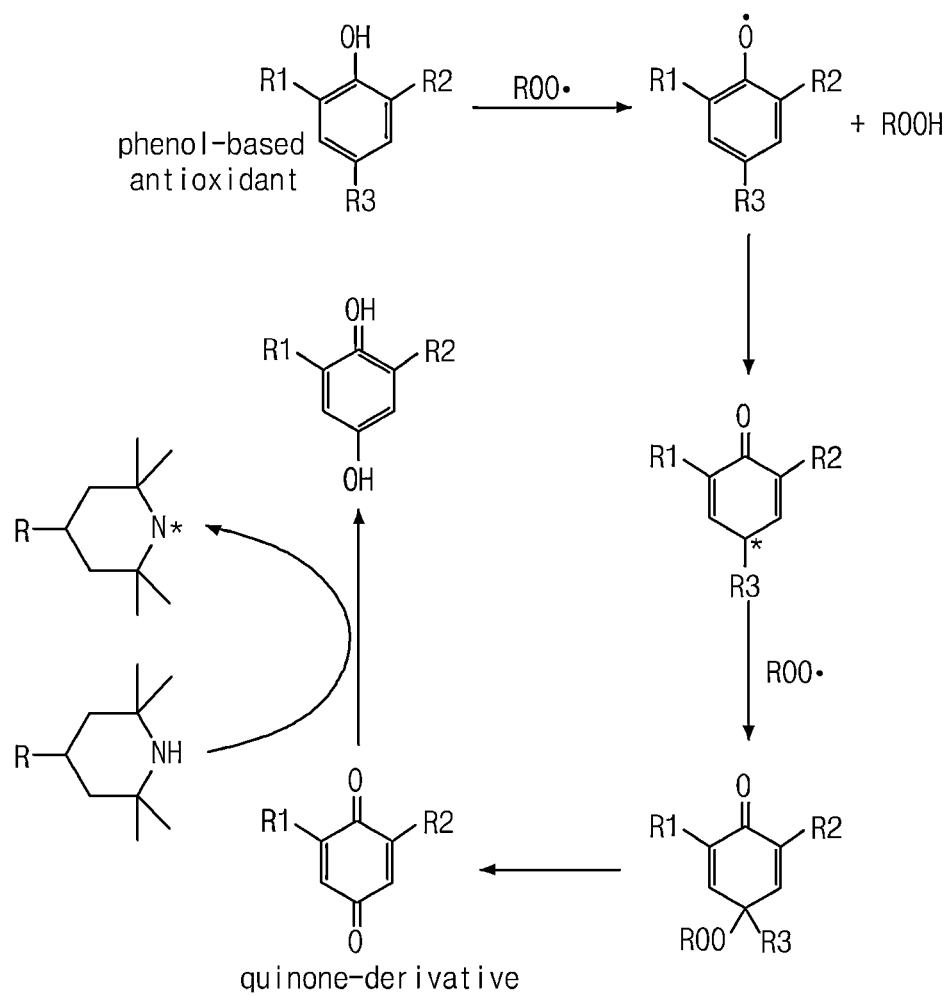
FIG. 4 is a view illustrating a recycle mechanism of a phenol-based antioxidant by HALS in a liquid crystal material of the present invention.

Namely, referring to FIG. 4, which is a view illustrating a recycle mechanism of a phenol-based antioxidant by HALS in a liquid crystal material of the present invention, the phenol-based antioxidant reacts with the radicals to stabilizer the radicals, and the quinine-derivative, as a product of the reaction between the phenol-based antioxidant and the radicals, is recycled by the HALS such that the function of the antioxidant is maintained.

Accordingly, even when the LCD device is operated for long time, the stabilization reaction of the radicals by the phenol-based antioxidant is continuously generated and the degradation of the operation property of the liquid crystal layer by the quinine-derivative is prevented.

Effects to the reliability in the liquid crystal layer including the phenol-based antioxidant and the HALS will be explained.

In an electrically controlled birefringence (ECB) liquid crystal panel, a voltage holding ratio (VHR, %) according to a time is measured with various cases, i.e., the liquid crystal layer including the liquid crystal molecules having alkenyl group without the phenol-base antioxidant and the HALS (case A), the liquid crystal layer including the liquid crystal molecules having alkenyl group with the phenol-base antioxidant and without the HALS (case B), the liquid crystal layer including the liquid crystal molecules having alkenyl group with HALS and without the phenol-base antioxidant (case C), and the liquid crystal layer including the liquid crystal molecules having alkenyl group with the phenol-base antioxidant and the HALS (case D).

In this instance, the phenol-based antioxidant represented by following Formula 3 is used, and the HALS represent by following Formula 4 is used. In addition, the phenol-based antioxidant is added by 1000 weight ppm with respect to the liquid crystal molecule, and the HALS is added by 250 weight ppm with respect to the liquid crystal molecule.

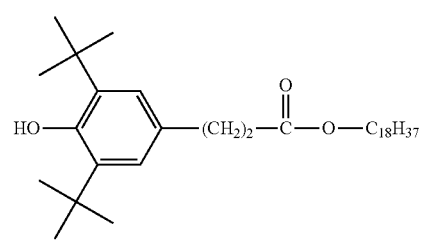

[Formula 3]

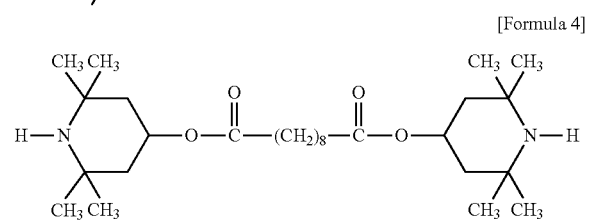

[Formula 4]

Figure 5:
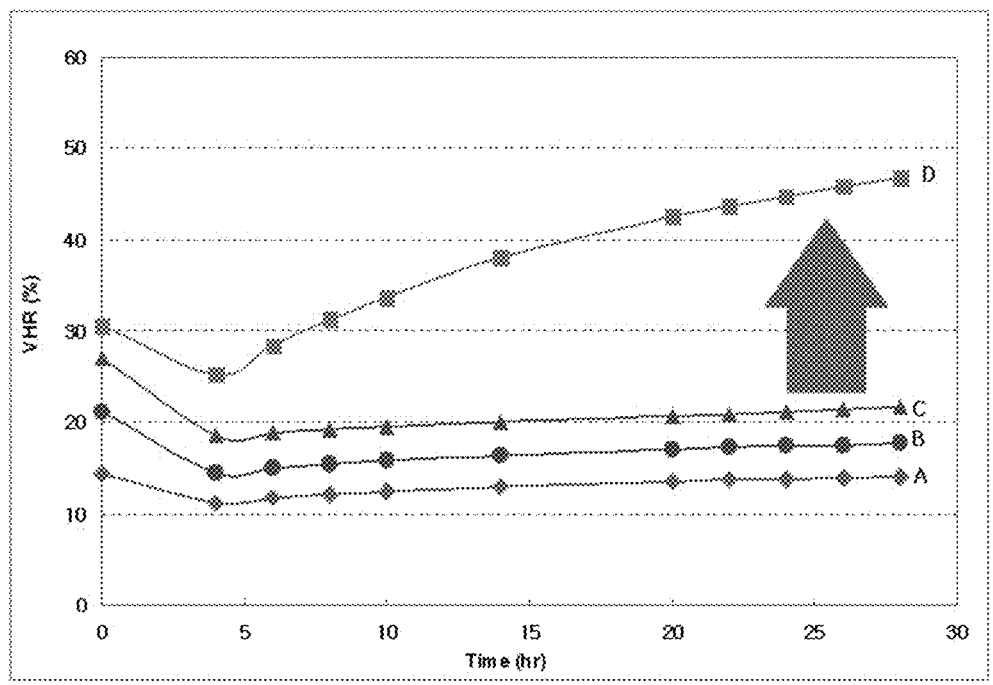
FIG. 5 is a graph showing an increase of the reliability in an LCD device including a liquid crystal material of the present invention.

Referring to FIG. 5, which is a graph showing an increase of the reliability in an LCD device including a liquid crystal material of the present invention, the voltage holding ratio in the case B and the case C is higher than the case A. Namely, the reliability of the LCD device is improved by the phenol-based antioxidant and by the HALS.

On the other hand, the case D has a similar driving property to the cases A, B and C, while the voltage holding ratio of the case D is rapidly increased after the long-time operation. Namely, as mentioned above, since the phenol-based antioxidant is recycled by the HALS, the reaction between the phenol-based antioxidant and the radicals (or ions) is continuously generated such that the reliability of the LCD device is remarkably increased.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal material, comprising:
a liquid crystal molecule including an alkenyl group;
a phenol-based antioxidant; and
a light stabilizer for recycling the phenol-based antioxidant,
wherein the phenol-based antioxidant is in an amount of 1000 weight ppm with respect to the liquid crystal molecule, and the light stabilizer is in an amount of 250 weight ppm with respect to the liquid crystal molecule,
wherein the phenol-based antioxidant is

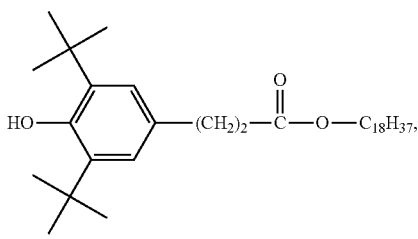

and the light stabilizer is

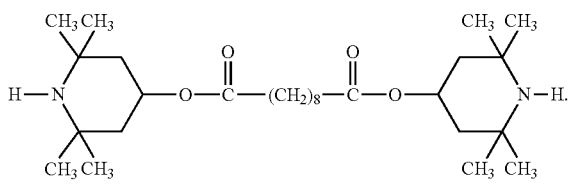

2. A liquid crystal display device, comprising:
first and second substrates facing each other;
a pixel electrode on the first substrate;
a common electrode on one of the first and second substrates;
first and second alignment layers respectively over the first and second substrates; and
a liquid crystal layer positioned between the first and second alignment layers, the liquid crystal layer including:
a liquid crystal molecule including an alkenyl group;
a phenol-based antioxidant; and
a light stabilizer for recycling the phenol-based antioxidant,
wherein the phenol-based antioxidant is in an amount of 1000 weight ppm with respect to the liquid crystal molecule and the light stabilizer is in an amount of 250 weight ppm with respect to the liquid crystal molecule, and
wherein the phenol-based antioxidant is

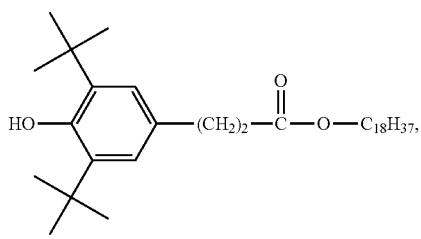

and the light stabilizer is

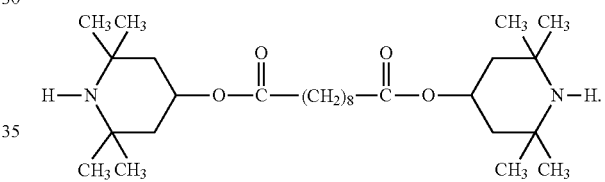

* * * * *